United States Patent
Bolusky et al.

(10) Patent No.: US 7,525,266 B2
(45) Date of Patent: Apr. 28, 2009

(54) INVERTER LOOP LATCH WITH INTEGRATED AC DETECTION RESET

(75) Inventors: Mark D. Bolusky, Brooklyn Park, MN (US); Cory L. Grabinger, Maple Grove, MN (US)

(73) Assignee: Honeywell International Inc., Morriston, NJ (US)

( * ) Notice: Subject to any disclaimer, the term of this patent is extended or adjusted under 35 U.S.C. 154(b) by 218 days.

(21) Appl. No.: 11/275,814

(22) Filed: Jan. 30, 2006

(65) Prior Publication Data

US 2007/0176570 A1 Aug. 2, 2007

(51) Int. Cl.
*H02P 1/00* (2006.01)

(52) U.S. Cl. .................. 318/280; 318/266; 318/265; 318/430

(58) Field of Classification Search .............. 318/696, 318/280, 108, 139, 782, 778, 266, 265, 282, 318/430, 432, 434, 438, 445, 453, 458, 552, 318/433; 360/75
See application file for complete search history.

(56) References Cited

U.S. PATENT DOCUMENTS

| | | | |
|---|---|---|---|
| 5,081,405 A | 1/1992 | Nelson | |
| 5,276,569 A | 1/1994 | Even | |
| 5,744,923 A | 4/1998 | Strauss et al. | |
| 6,140,790 A | 10/2000 | Heine et al. | |
| 6,237,630 B1 | 5/2001 | Stone et al. | |
| 6,370,336 B1 | 4/2002 | Nishinou et al. | |
| 6,407,522 B1 | 6/2002 | Andersson et al. | |
| 6,531,837 B1 | 3/2003 | Forstl et al. | |
| 6,624,531 B2 | 9/2003 | Disser et al. | |
| 6,674,191 B2 | 1/2004 | Kujira | |
| 6,681,559 B2 | 1/2004 | Johnson | |
| 6,709,073 B2 | 3/2004 | Riddiford et al. | |
| 6,710,570 B2 | 3/2004 | Bruzy et al. | |
| 6,851,620 B2 | 2/2005 | Hill | |
| 2005/0029974 A1* | 2/2005 | Fitzgibbon et al. | 318/280 |
| 2005/0270682 A1* | 12/2005 | Saga | 360/75 |

* cited by examiner

*Primary Examiner*—Karen Masih

(57) ABSTRACT

A first illustrative embodiment includes an actuator having both a Run state and a Hold state, the actuator including circuitry for detecting power supply abnormalities and causing the Run state to occur following a power supply abnormality. In another illustrative embodiment, the present invention includes an actuator having both a Run state and a Hold state, the actuator including a power detect circuit that keeps the actuator from entering the Hold state when the power supply is below a certain level.

20 Claims, 8 Drawing Sheets

| | A | B | C | D | Out | State | C1 | C2 | C3 |
|---|---|---|---|---|---|---|---|---|---|
| On after long Off | L | H | H | L | H | Run | 0 | + | 0 |
| Run State | L | H | H | L | H | Run | Vce | V2 | 0 |
| Actuator Stops | L to H | L | L | H | L | Hold | Vce+ | V2 | + |
| Hold State | H | L | L | H | L | Hold | Vcc | V2 | V3 |
| Short Off | H- // L- | * | * | * | * | * | 0 | V2- | 0 |
| On after short Off | H | L | L | H | H | Run | 0+ | Vu2 | 0+ |

INVERTER LOOP LATCH WITH INTEGRATED AC DETECTION RESET

FIELD

The present invention is related to the field of actuators. More particularly, the present invention is related to motor control for an actuator that has multiple output modes including at least one mode for actuation and another mode for holding a position.

BACKGROUND

Some electric motors are used in actuators that provide motion between a first position and a second position. For example, an actuator may be coupled to a spring that biases it to a first position. An electric motor for the actuator may activate and move the actuator to a second position against the spring bias. Once the second position is reached, it is often desirable to stop further actuation while holding the actuator in the second position. Continuing to operate the electric motor at full power with the actuator against, for example, a physical stop, may cause wear on various components of an actuator system. Instead, in some systems, a lower power Hold state is used to keep the actuator in the second position. In the Hold state, the electric motor exerts sufficient force to keep the actuated device in its desired position without excessively straining the actuated piece. The inclusion of a Hold state may also reduce power consumption and associated heat.

Some designs may encounter problems, however, when power to the actuator system is less than ideal (e.g. interrupted or lower than expected). For example, when power turn-on occurs slowly, analog latching circuitry may fail to enter the correct post-turn-on state. The result can be that the motor enters a Hold state, rather than the run state.

For another example, a power interruption may allow motion of the actuator away from a desired position while also causing the actuator system to enter or remain in the Hold state once power is restored. If this occurs, the actuator will not be in its desired position and, since the Hold state occurs, the actuator will remain in this incorrect position. It would be useful to prevent and/or remedy such circumstances.

SUMMARY

The present invention, in an illustrative embodiment, includes an actuator having both a Run state and a Hold state. In one illustrative embodiment, the actuator includes circuitry for detecting power supply abnormalities and causing the actuator to enter the Run state following a detected power supply abnormality. In another illustrative embodiment, the present invention includes an actuator having both a Run state and a Hold state, wherein the actuator includes a power detect circuit that keeps the actuator from entering the Hold state when the power supply is below a certain level.

DETAILED DESCRIPTION

The following detailed description should be read with reference to the drawings. The drawings, which are not necessarily to scale, depict illustrative embodiments and are not intended to limit the scope of the invention.

Figure 1:
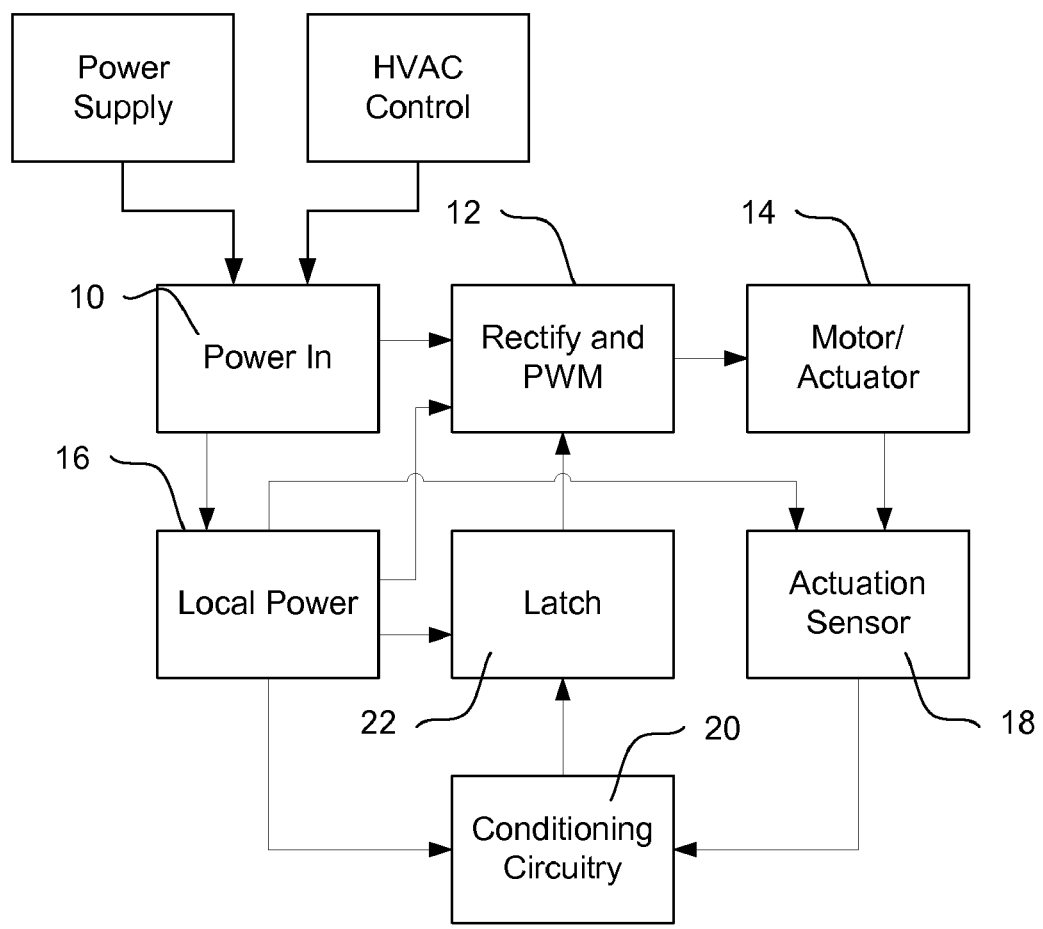
FIG. 1 is a block diagram of a device for controlling and providing power to an electric motor actuator.
Figure 8:
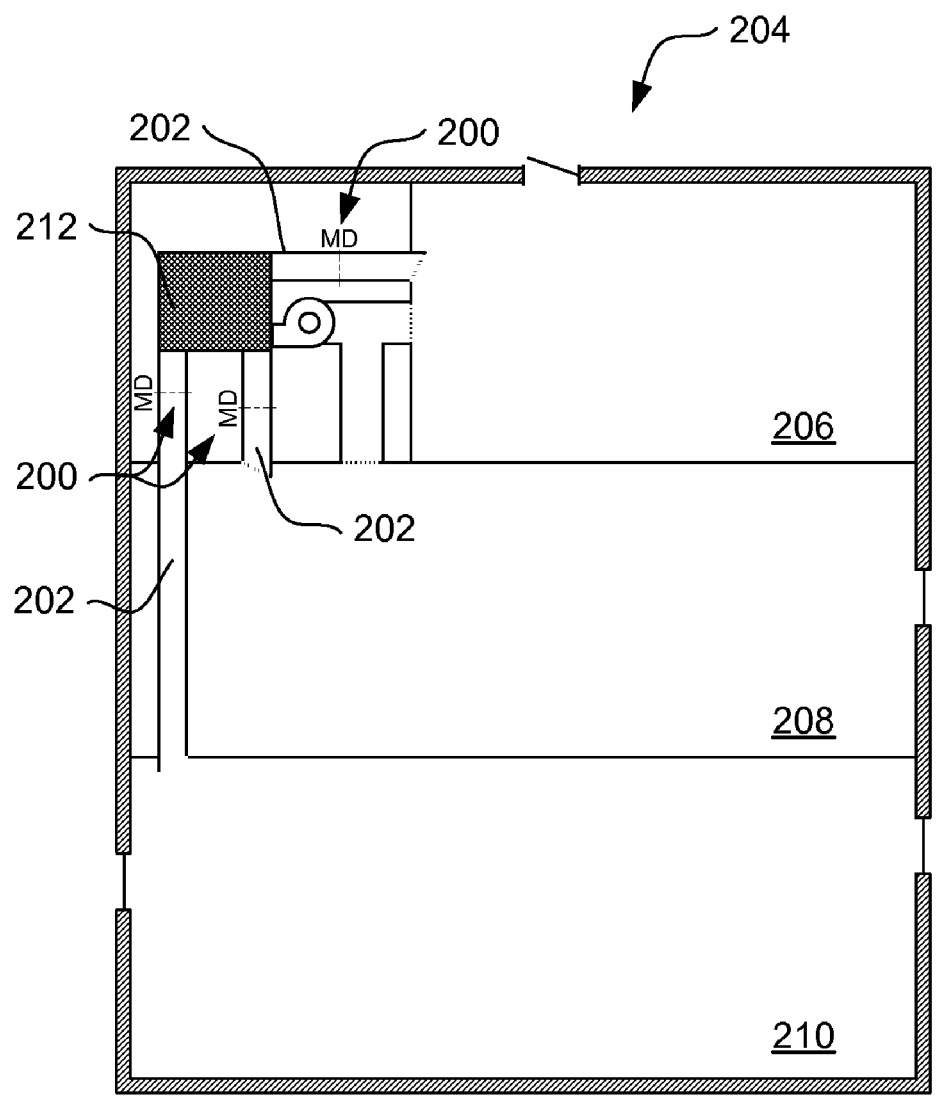
FIG. 8 is a block diagram showing an illustrative multi-zone enclosure with an associated HVAC system having a plurality of dampers to control ventilation.

FIG. 1 is a block diagram of a device for providing power to an electric motor actuator. Power is received at Power In block 10. The Power In block 10 may include an on/off switch/selector, or the actuator may be adapted for use in a system where a power signal is selectively provided. For example, the system may be included in an HVAC system as illustrated by FIG. 8. In the illustrative embodiment of FIG. 1, an HVAC control signal is received by the Power In block 10 to selectively switch the actuator ON/OFF. Power is received separately. In other embodiments, the HVAC control may directly control whether power will be received at the Power In block 10.

The incoming power signal may undergo rectification and may be subjected to pulse width modulation (PWM), as shown at 12. Depending upon the pulse width, the system will either be in a Run state (wider pulse width=higher average power) or Hold state (narrower pulse width=lower average power). The rectified and modulated power signal is then provided to the motor/actuator 14 to cause it to either run or hold.

The power in at 10 is often provided at a voltage that would be excessive for use in various control devices. For example, the incoming voltage for most HVAC systems may be a 24 volt AC signal. In some cases a local power subcircuit is provided at 16 to regulate a signal and create a lower voltage (e.g. 5 volts) generally DC signal for non-driving uses. For example, local power 16 may be used by an actuation sensor 18, conditioning circuitry 20 and a latch 22. The actuation sensor 18 may be any suitable sensor, for example, a Hall sensor may be used. When a Hall sensor is used, actuation is observed by placing magnets in association with the axel of the electric motor being used to power actuation. Other motion sensors may also be used, such as a contact sensor, a current sensor, an optical motion sensor, or the like. Depending upon the tolerances and type of actuation sensor 18, unregulated power may also be used to power that portion of the device, if desired. The local power subcircuit 16 may be omitted in some designs.

In operation of the illustrative embodiment, the actuation sensor 18 observes movement of the motor or the actuated part to detect when the motor stalls and/or the actuated part reaches its motion limit. The output of the actuation sensor 18 may optionally be modified by conditioning circuitry 20 before it is provided to a latch 22. A change in the actuation sensor 18 output indicating motor/actuator 14 stall is used to set the latch 22. An output from the latch 22 is used to modify the PWM at 12. When the latch is not set, the PWM block 12 may provide higher average power to run the motor and cause actuation. When the latch is set, the PWM block 12 may provide lower average power to hold position.

An example of the use of a device as illustrated in FIG. 1 is found in FIG. 8. As seen in FIG. 8, dampers 200 are provided in a ventilation system 202 in an enclosure 204, to control which of several zones 206, 208, 210 receive heating/cooling from one or more HVAC devices 212. Typically each damper 200 will include a mechanical part that opens/closes in response to a control signal provided thereto. Often the electric motor operates in contra-action to a spring or other biasing device. Usually, when the electric motor is activated, it runs until the mechanical portion of the damper reaches a desired open position, and then the electric motor goes into a Hold state to keep the damper open. Once power is removed from the electric motor, the damper closes as a result of the spring or other biasing force. The use of such "normally closed" dampers may provide a fire and/or smoke containment function since, if power is lost during an emergency, the dampers will close to isolate each zone 206, 208, 210 from the other zones 206, 208, 210. As explained below, a damper having an intermediate position may also be used and may incorporate various embodiments of the present invention.

Figure 2:
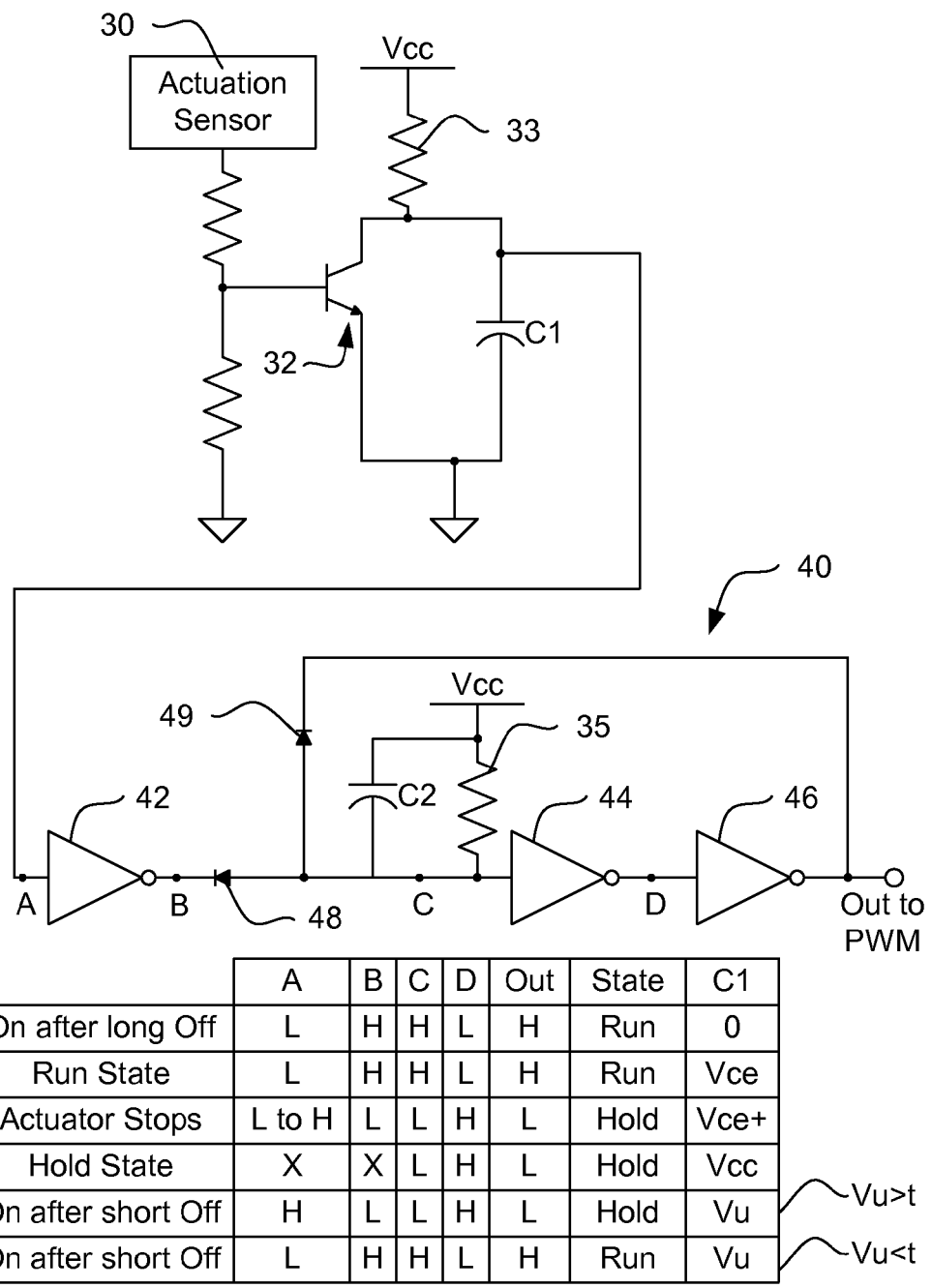
FIG. 2 is a schematic diagram showing a current sensing, and latching circuit.

FIG. 2 is a schematic diagram for a current sensing and latching circuit. FIG. 2 provides an example embodiment of the actuation sensor 18, conditioning circuitry 20 and latch 22 of FIG. 1. Referring to FIG. 2, the actuation sensor 30 has an output related to the detected current through the motor. The output from the actuation sensor 30 is provided to a (dual resistor) voltage divider to a transistor 32. When the actuation sensor 30 provides a high enough output, the transistor 32 is on and draws current through the pull up resistor 33 from Vcc, keeping capacitor C1 at low voltage. Those of skill in the art will understand that various actuation sensors 30 and associated components may be used in various configurations to provide a signal that selectively turns the transistor 32 on or off.

The voltage across capacitor C1 is provided to a latching circuit shown generally at 40. A first inverter 42 receives the voltage signal from capacitor C1 and provides an output to a second inverter 44, which is in turn coupled to a third inverter 46. Diodes 48, 49 isolate the outputs of inverters 42, 46 from one another.

The node "C" between the first inverter 42 and second inverter 44 is coupled to Vcc via a pull up resistor 35 and another capacitor C2. The table beneath the schematic aids in understanding the circuit operation. For use in the table, nodes A, B, C, D and Out are labeled.

When the device is first turned on after a long period of being off, all the capacitors in the system are discharged, including C1 and C2. Because C1 has zero voltage, node A starts off Low. Inverter 42 makes node B High. With no charge across C2, node C jumps to Vcc or High as shown. Node D is therefore Low, making the output from the third inverter 46 ("Out" in the table) High. With Out High, the system is in the Run state. The PWM block (FIG. 1) preferably receives the High signal from the third inverter 46 and provides a relatively higher average power output to drive an associated electric motor.

During actuation, and while in the Run state, the actuation sensor 30 provides a High output, keeping transistor 32 on such that C1 remains generally discharged (shown as the threshold Vcc for the transistor 32 on the chart, which will typically be in the range of 0.1 volts or less). Therefore node A is Low, and node B is High. The diodes 48, 49 isolate the outputs of either inverter 42 or inverter 46 when either is High. This leaves node C High, via the pull-up resistor and capacitor C2 to Vcc. With C High, node D is Low, and Out remains High.

When the actuator hits its mechanical limit, it stops and causes the electric motor to stall. Once the motor has stalled, current through the motor will drop and the output from the actuation sensor 30 also drops, shutting off transistor 32. This allows C1 to charge, raising the input to inverter 42. After a short period of time, the input to inverter 42 crosses its High/Low threshold, switching node B to Low. This drains current via diode 48 and pulls down the voltage at node C, since the current must come from Vcc via the resistor. Capacitor C2 is charged by this process as well. Node C is therefore Low, making node D High, and the output from inverter 46 goes Low.

The latch operates in part because, once the output of inverter 46 is Low, diode 48 prevents the output from inverter 42 from raising the voltage at C. Current drains to the output from inverter 46 via diode 49, keeping node C low. As such, the latch 40 is now set, and the device enters the Hold state. In an illustrative example, the output from inverter 46 is used to determine a level of pulse width modulation that occurs. In the illustrative example, the PWM operates at about 80% when the output of the inverter 46 is high (the Run state), and about 20% when the output of the inverter 46 is low (the Hold state). Other percentages may be used, or other methods of using the output of the inverter 46 to define Run and Hold states may also be used.

The above works quite well under normal operation, however, problems can arise when a power disruption occurs. Due to the spring action of the actuator, when the power is off even for a short period of time, the actuator can move from its open position. However, as indicated as Vu in the chart, the voltage on capacitor C1 is not specifically controlled when the device goes off for a short period of time. If C1 retains a voltage above the threshold High/Low voltage for inverter 42, this will set the latch immediately following return of power. Likewise, capacitor C2, if it does not drain quickly, will push the voltage at node C down after a short off time period. If this causes the output of inverter 46 to be low, the latch will remain set. However, the actuated device will have moved from its desired position.

The chart at the bottom of FIG. 2 illustrates the problem. Specifically, when the device comes on after a short off (i.e. after an interruption in the power supply), whether the Run state or Hold state occurs will depend upon the unknown voltage, Vu, on C1. If Vu exceeds a threshold t for the inverter 42, the Hold state will occur. If a longer Off time has occurred, Vu may be less than the threshold t for the inverter 42, and the Run state will occur. However, because the actuated part may move from its desired position during a short Off time, it would be preferable to enter the Run state whenever a short Off period occurs. In practice it has been found that typical designs require at least 2-3 seconds to discharge C1 sufficiently to enter the Run state, however, this would be a long power supply interruption for most systems.

Another difficulty which has been identified is that of a slow turn-on. For example, if several actuators are turned on at the same time, the available power may be unexpectedly low for a short period of time. This may occur, for example, when an HVAC system device comes on-line and calls for opening of several dampers at once. Not only does the HVAC device itself cause an immediate drain in available power, but each damper may affect the available power. If the motor fails to actuate until it receives a given voltage level, other system parts may begin operating too soon.

For example, Vcc is typically provided by the use of a voltage regulator. If Vcc is at 5 volts, it becomes available once the supply voltage exceeds 5 volts by some relatively small margin (typically 1-2 volts, depending upon the rectification circuit used). The controlling circuitry in the sensor, latch, and conditioning circuitry becomes available at least at that level, and may become operational even earlier, before Vcc reaches its desired level.

However, actuation may not begin until a higher voltage is received. In testing, it has been found that, with the design shown above and with a relatively common electric motor, actuation occurs at about 8 volts of received signal. Vcc will be enabled at a lower voltage. As a result, if the supply voltage turns on slowly, for whatever reason, the latch may be set before the supply voltage reaches a level where the motor actuates. This would cause the circuit to enter a Hold state before any actuation occurs. In an HVAC system, this would leave one or more dampers closed when they should be open, undermining system operation and potentially creating a hazard in the area of the heated air plenum.

In some embodiments, intermediate positions between full open and full shut may be used as well. For example, a sensor may be disposed relative to an actuated part to determine when the part has reached a desired intermediate position. Using a position sensor to start the Hold state may provide some alleviation of the difficulty of slow turn-on. However, when the desired position is detected, the Hold state may be entered. Unless a microcontroller (often a relatively expensive addition) is used to continually check position, a similar problem as explained above may occur if a power supply abnormality occurs. Further, for dampers that are adapted for fire safety and containment, a microcontroller may be a poor choice since such dampers may need to operate in high temperature conditions to which a microcontroller may be poorly suited. Specifically, an actuated part may move during a power supply abnormality from its desired intermediate position. The Hold state, however, may result from latching, and unless the position sensor is used to reset the latch, position changes may occur. The problem with the full-open position would still remain as well, unless multiple position sensors are used.

Figure 3:
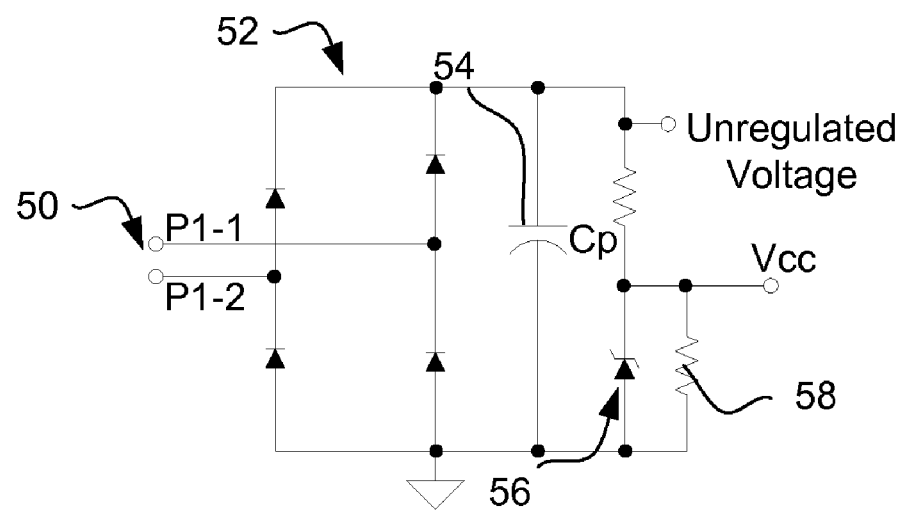
FIGS. 3-4 illustrate schematic diagrams for providing rectified and regulated power.
Figure 4:
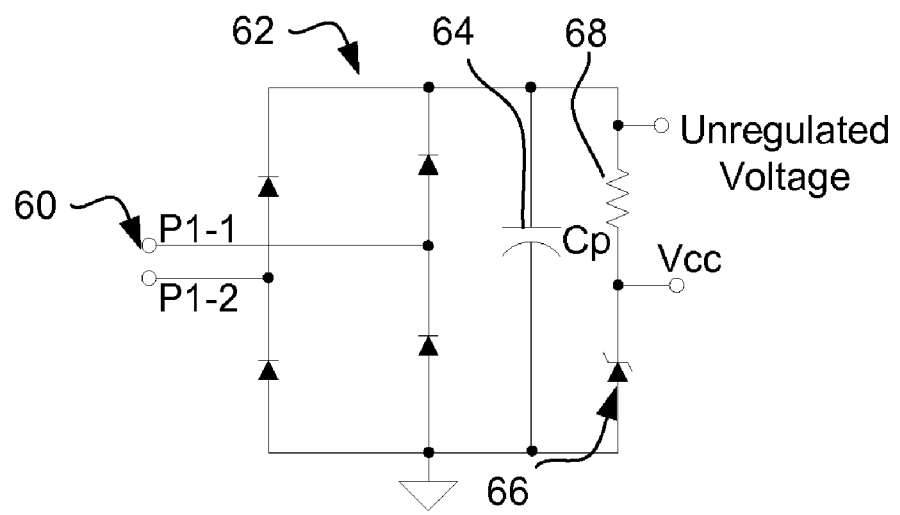

FIGS. 3-4 illustrate schematic diagrams for providing rectified and regulated power. FIG. 3 illustrates an embodiment where power is received at 50 and is then rectified by a diode bridge 52. The result is rectified and filtered but unregulated. The unregulated voltage is then passed to a PWM circuit and ultimately fed to the electric motor that drives actuation. This signal is smoothed by the power capacitor 54 in combination with a pair of resistors including the bleeder resistor 58. Parallel to the bleeder resistor 58 is a Zener diode 56, which regulates the voltage for Vcc. With the circuit of FIG. 3, even assuming there is no current drain in other circuitry, the Vcc power capacitor 54 will drain more quickly due to the bleeder resistor 58.

FIG. 4 is generally similar to FIG. 3 except that the bleeder resistor 58 has been removed. Specifically, power is received at 60 and rectified by the diode bridge 62. The power capacitor 64 stores up energy and smoothes the unregulated voltage. However, when power is interrupted at 60, the Vcc power capacitor will not drain as quickly (assuming no drain by the unregulated voltage output), meaning that Vcc remains available for some period of time. The power capacitor 64 will drain only to the point that the Zener diode 66 reaches its breakdown voltage. In an illustrative example, the power capacitor 64 is a 470 microfarad capacitor, and resistor 68 is a 2 kilohm resistor. Omission of the bleeder resistor of FIG. 3, while potentially a useful design aspect, is not necessary to several illustrative embodiments.

Figure 5:
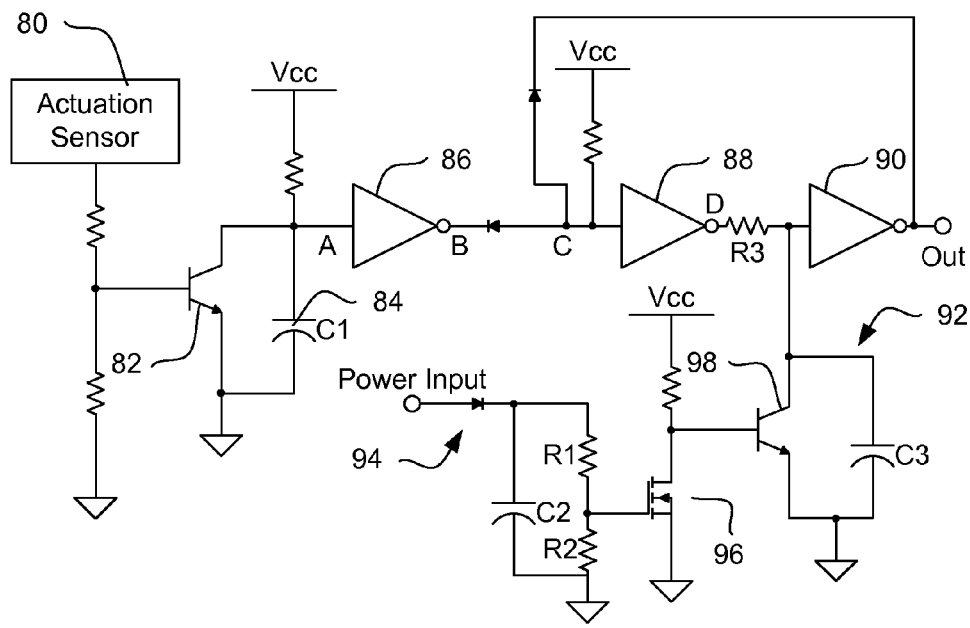
FIGS. 5-6 are schematic diagrams showing two illustrative embodiments.
Figure 6:
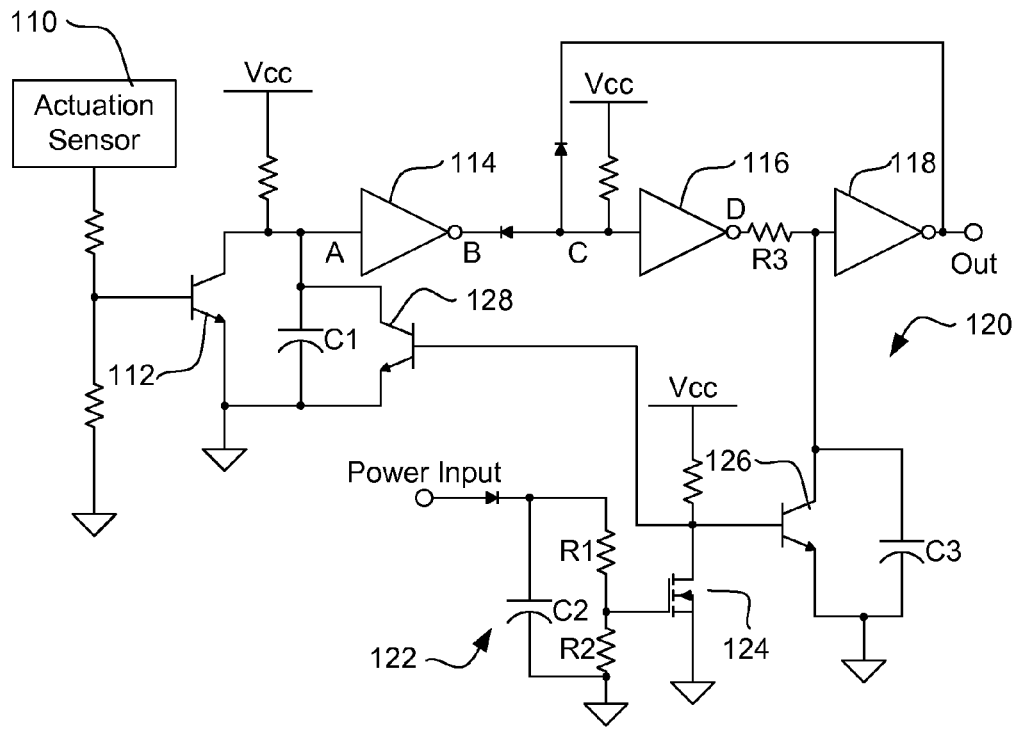

FIGS. 5-6 are schematic diagrams for two illustrative embodiments. The illustrative embodiment of FIG. 5 shows the current sensing and latching portions of a device as shown in FIG. 1. A actuation sensor 80 provides an output that is received at transistor 82. The transistor 82 is on while sufficient current is detected by the sensor 80. When the transistor 82 turns off, capacitor 84 begins to charge, raising the voltage at A. Once A crosses a threshold for the inverter 86, node B goes low, pulling current from Vcc via the pull-down resistor and bringing node C low. This will set the latch including inverters 88, 90.

As shown at 92, additional circuitry for detecting power supply abnormalities is provided in the illustrative embodiment and couples to a location between inverters 88 and 90. Specifically, a power input (which can be either of the inputs P1-1 or P1-2 at 50, 60 in FIGS. 3-4) is rectified by diode 94 and filtered by capacitor C2. The voltage divider R1, R2 reduces the captured voltage and supplies it to transistor 96. In an illustrative example, C2 is a 0.33 microfarad capacitor, R1 is 100 kilohms, and R2 is 8 kilohms. Capacitor C2 provides a sampling sub-circuit for determining whether a power supply abnormality has occurred.

When power is fully on, the transistor 96 is On. With transistor 96 On, the base for transistor 98 is more or less grounded, turning transistor 98 Off. This allows node D to provide an input to inverter 90 and allows the latching circuit to latch normally, albeit with a delay introduced by resistor R3 and capacitor C3.

When a power supply abnormality occurs, the voltage on capacitor C2 does not raise high enough to keep transistor 96 On. This may occur either when there is a slow turn-on of the power input, or when the power supply is temporarily interrupted. Thus, the circuit for detecting power supply abnormalities shown at 92 detects both interruptions and slow turn-on. As noted above, if a relatively large capacitor is used to smooth Vcc and the impedance to ground of Vcc is relatively low, Vcc will remain active and available even during a power supply abnormality for at least some period of time. In some embodiments, consideration may be given to other circuit elements when designing the Vcc sub-circuit, and the Vcc sub-circuit may be designed to retain power supply long enough to assure Vcc remains available until other parts of the circuitry have been drained of residual voltage.

With transistor 96 Off, the base for transistor 98 receives an increased voltage (approximately Vcc), and turns On. When transistor 98 is On, it drains current from node D via resistor R3 and drives the input to inverter 90 Low. This prevents the latch from latching and holds the device in Run mode until power is fully restored/received. The inclusion of the capacitor C3 further delays turn-on by at least some margin.

The chart at the bottom of FIG. 5 illustrates that, regardless of the initial residual voltage on C1, the output at "Out" will be High at least briefly following a power abnormality. This then leads to a Run state.

In some embodiments, the sub-circuit for providing Vcc is designed such that Vcc holds sufficient charge to allow operation of transistor 98 long enough to drain capacitor C3 and disable the latch. When the power returns after a long or short Off period, the Run state occurs for at least a short period of time until capacitor C2 charges sufficiently to turn on transistor 96, turning off transistor 98. The latch is then enabled, but will only latch if capacitor C1 remains sufficiently charged to drive node A high. If actuation occurs during the time period before the latch is enabled, the actuation sensor 80 will drive transistor 82 On. With transistor 82 On, capacitor C1 is drained, keeping the latch from being set until actuation ends.

If slow turn-on occurs, the latch is disabled until the power input reaches an amplitude that drives the transistor 96 On. The values indicated above for the resistors R1, R2, and capacitor C2, were selected such that, during testing, the latch is enabled once the power input voltage reaches about 12 volts. If actuation occurs at 8 volts, then the design provides a margin between the occurrence of actuation and the enabling of the latch. Other parameters (resistor and capacitor values, etc.) may be used, and the margin may be wider or narrower. If a different motor is used, modifications may be made as well to adapt the illustrative embodiment.

FIG. 6 shows a schematic diagram for another illustrative embodiment. In the embodiment of FIG. 6, the actuation sensor 110 again provides an output that turns on the transistor 112 until sufficient current drop occurs, at which point C1 charges to drive node A high, setting the latch including inverters 114, 116, 118. The circuit for detecting power supply abnormalities shown at 120 includes, again, a node receiving power from a power input and a rectifying diode 122. C2, R1 and R2 keep transistor 124 On when the power supply is normal.

If a power supply abnormality occurs (e.g. slow power-up and/or interruption), transistor 124 is Off, raising the voltage at the base of each of transistor 126 and transistor 128, which is new to the design of FIG. 6 when compared to FIG. 5. Again, transistor 126 draws the input to inverter 118 Low, disabling the latch and keeping the output High. In addition, transistor 128 shorts capacitor C1 to ground, eliminating any residual charge on C1. This additional step further helps assure that the latch circuit will not become set until the Run state has occurred and the actuated part has reached its limit.

Figure 7:
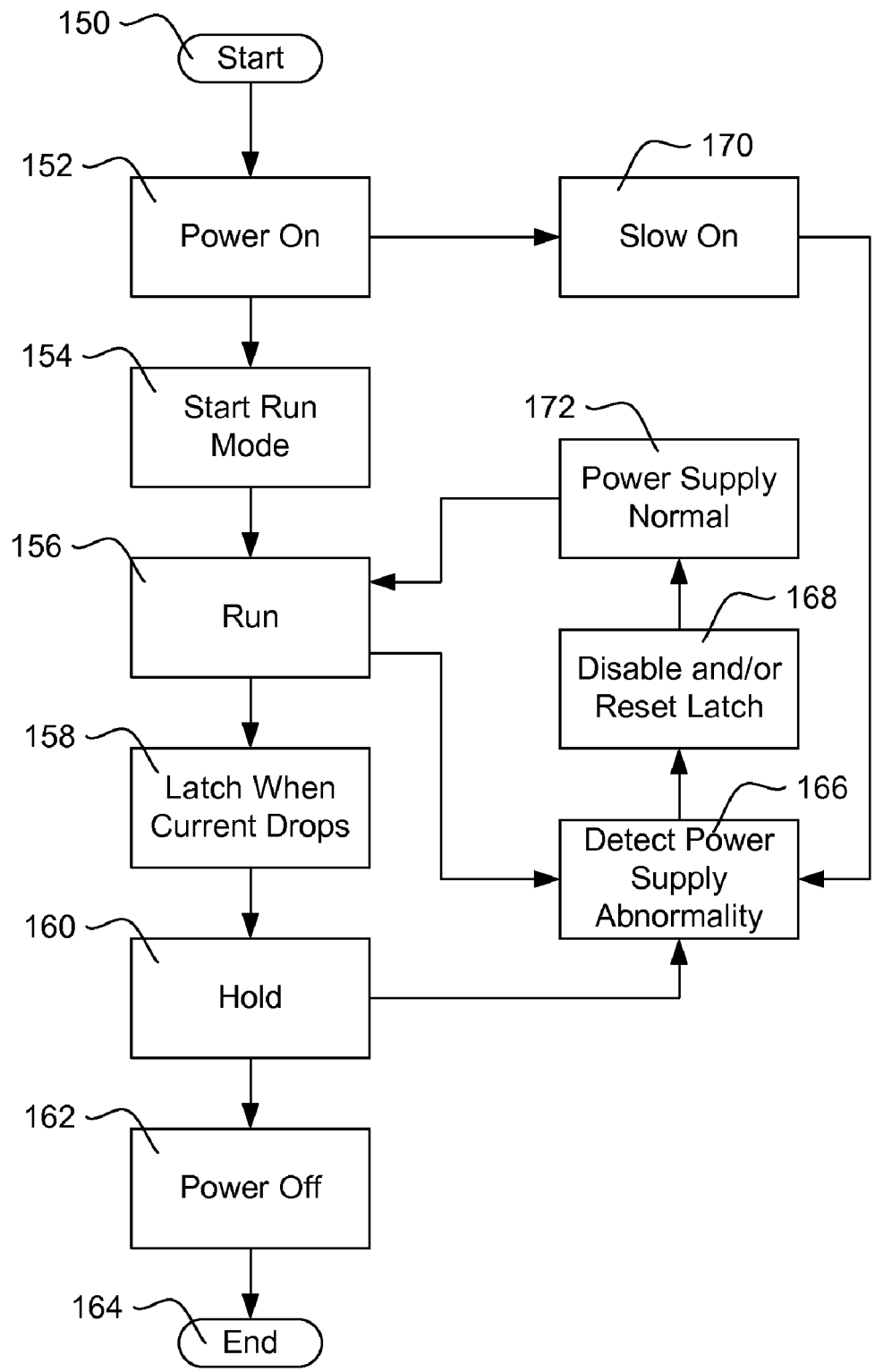
FIG. 7 is a flow diagram showing an illustrative method.

FIG. 7 is a block diagram for an illustrative method. The method begins, from start block 150, when the power is turned on at block 152 for the actuating device. At power on, assuming normal power operation, the run mode starts, as shown at block 154. The device then runs, as shown at block 156, until sufficient current stops and the latch is set, as shown at block 158. The device enters a Hold state, as shown at block 160 and, ideally, remains there until the power to the device is turned off, as shown at block 162, and the method ends at block 164. Power to the device may be turned off, as discussed in relation to FIG. 1, either by termination of power supply or by receipt of a control signal that indicates the power is to be turned off. When the device is turned off, the actuated part (for example a damper in an HVAC system) may return to its original position by spring action or other pre-biasing.

If a power abnormality occurs either during the Run state shown at block 156 or the Hold state shown at block 160, the method goes to block 166. Also, if a slow turn-on is detected, as shown at block 172, the method goes to block 166. At block 166, a power supply abnormality has been sensed, and the method continues to disable and reset the latch, as shown at block 168. Once the power supply abnormality has ended, as shown at block 172, the method then goes to the Run state, as shown at block 156. Operation then continues as before.

Figure 9:
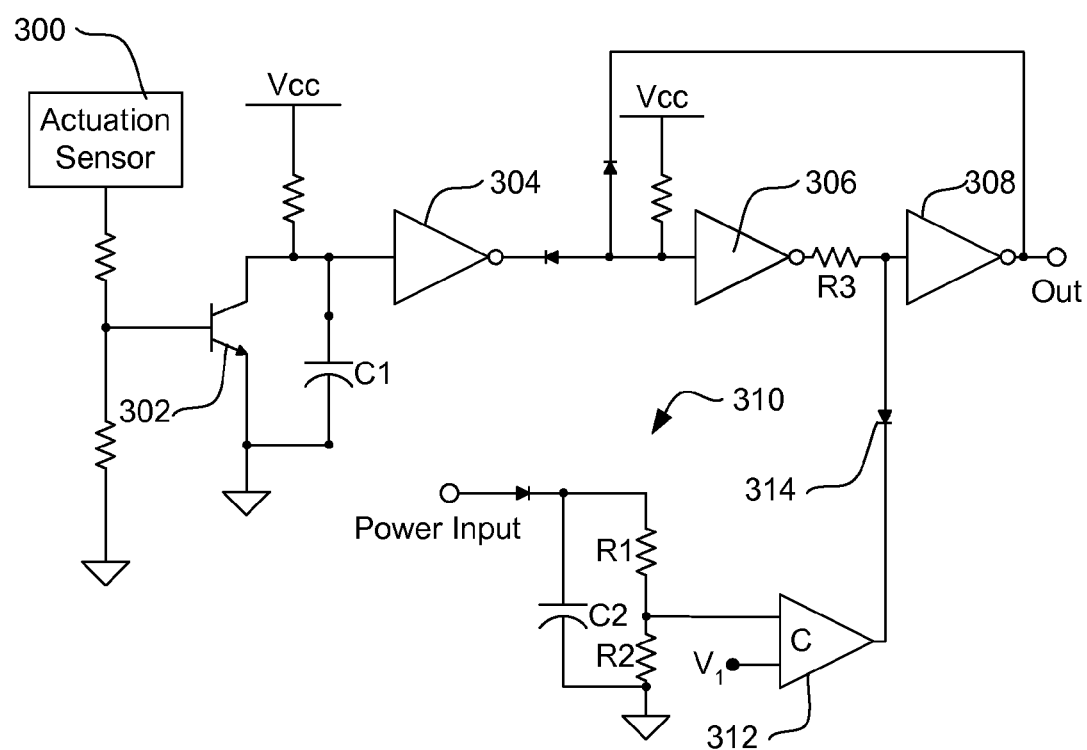
FIG. 9 is a schematic diagram of another illustrative embodiment.

FIG. 9 is a schematic diagram of another illustrative embodiment. In the illustrative embodiment, a actuation sensor 300 is used in association with a transistor 302 and inverters 304, 306, 308 in a manner similar to that explained above. Different circuitry for detecting power supply abnormalities is shown at 310. Specifically, the power supply voltage is captured and monitored using a diode, capacitor, and resistors, in a similar manner to that shown above. Rather than a plurality of transistors, the illustrative embodiment of FIG. 9 makes use of a comparator shown at 312 to compare the sampled power supply voltage to $V_1$. $V_1$ may be considered a threshold for supply voltage, and may be provided in any suitable manner (for example, a voltage divider in association with a regulator or Zener diode). If the sampled power supply voltage exceeds $V_1$, the comparator 312 provides a high output. Diode 314 isolates the comparator 312 when it has a high output, allowing the latch to operate in its usual manner. If $V_1$ exceeds the sampled power supply voltage, then the comparator 312 provides a low output, draining current through the diode 314 and grounding the input to inverter 308. To aid in the illustrative embodiment, the diode 314 may be selected to have a relatively low forward threshold voltage. In an alternative to the embodiment of FIG. 9, the comparator 312 is replaced with a device having either a low (ground) output or a high impedance output, which would eliminate a need for the diode 314. In yet another alternative, polarities may be reversed, and the comparator 312 may feed the base or gate of a transistor that is used to ground the input to the third inverter 308.

As used herein, an average magnitude of power supply may be determined over any suitable time frame, for example, anywhere in the range of about 5 milliseconds or less to 5 seconds or more.

The selection or identification of specific values in the above illustrative embodiments should be understood as merely illustrative, and different solutions given different parts and values may be used, if desired.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. An actuator having a Run state and a Hold state, the actuator comprising circuitry for detecting power supply abnormalities, the circuitry for detecting power supply abnormalities being operable to cause the actuator to enter the Run state following a detected power supply abnormality, the actuator further comprising a latching circuit having first and second states that correspond to the Run state and the Hold state, respectively, wherein the circuitry for detecting power supply abnormalities is coupled to the latching circuit.

2. The actuator of claim 1 wherein the circuitry for detecting power supply abnormalities operates to reset the latching circuit when a power supply abnormality is detected.

3. The actuator of claim 1 wherein the circuitry for detecting power supply abnormalities operates to disable and reset the latching circuit when a power supply abnormality is detected.

4. The actuator of claim 1 wherein the circuitry for detecting power supply abnormalities is adapted to receive an alternating current power supply signal.

5. The actuator of claim 1 wherein the circuitry for detecting power supply abnormalities compares a signal representative of power supply magnitude to a supply threshold and provides an output in response to the comparison.

6. An HVAC damper comprising the actuator of claim 1.

7. An actuator having a Run state and a Hold state, the actuator comprising circuitry for detecting power supply abnormalities, the circuitry for detecting power supply abnormalities being operable to cause the actuator to enter the Run state following a detected power supply abnormality, wherein the circuitry for detecting power supply abnormalities is adapted to receive an alternating current power supply signal, and wherein the circuitry for detecting power supply abnormalities includes a rectifier sub-circuit and a sampling sub-circuit.

8. The actuator of claim 5 wherein the comparison is performed with a comparator.

9. The actuator of claim 5 wherein the comparison is performed using a transistor, wherein the supply threshold is related to an operational threshold for the transistor.

10. An actuator having both a Run state and a Hold state, the actuator comprising an electric motor that begins actuation when a power supply is at or above a first magnitude, the actuator further comprising a power detect circuit that prevents the actuator from entering the Hold state when the power supply is below the first magnitude, wherein the power detect circuit prevents the actuator from entering the Hold state when the power supply is below a second magnitude that exceeds the first magnitude, the actuator further comprising a latching circuit that determines whether the actuator is in the Run state or the Hold state, wherein the power detect circuit is coupled to the latching circuit and impedes latching of the latching circuit when the power supply is below the second magnitude.

11. The actuator of claim 10 wherein the power detect circuit is further adapted to detect abnormalities in the power supply and cause operation of the Run state after a power supply abnormality is detected.

12. An actuator having both a Run state and a Hold state, the actuator comprising an electric motor that begins actuation when a power supply is at or above a first magnitude, the actuator further comprising a power detect circuit that prevents the actuator from entering the Hold state when the power supply is below the first magnitude, wherein the power detect circuit prevents the actuator from entering the Hold state when the power supply is below a second magnitude that exceeds the first magnitude, and wherein the power detect circuit is further adapted to detect abnormalities in the power supply and cause operation of the Run state after a power supply abnormality is detected.

13. An actuator having both a Run state and a Hold state, the actuator comprising an electric motor that begins actuation when a power supply is at or above a first magnitude, the actuator further comprising a power detect circuit that prevents the actuator from entering the Hold state when the power supply is below the first magnitude, the actuator further comprising a latching circuit that determines whether the actuator is in the Run state or the Hold state, wherein the power detect circuit is coupled to the latching circuit and impedes latching of the latching circuit when the power supply is below the first magnitude.

14. A driver circuit for an actuator, the driver circuit comprising:
   a latching output circuit configured to provide a Run output for a Run state and a Hold output for a Hold state, the latching output circuit providing the Run output during actuation of the actuator and the Hold output after actuation has stopped, the latching output circuit including a latch for controlling whether the Run output or the Hold output is provided; and
   a reset circuit coupled to the latching output circuit such that, when power to the driver circuit fails, the latch is reset by the reset circuit to cause the Run output to be provided.

15. The driver circuit of claim 14 wherein the reset circuit resets the latching output circuit when the magnitude of power supplied to the driver circuit falls to or below an abnormal level.

16. An HVAC damper comprising an actuator having the driver circuit of claim 14.

17. A method of operating an actuator, the method comprising:
   operating the actuator in a Run state during a first period of time, when in the Run state, the actuator is driven toward a first position;
   while in the Run state, determining that actuation to the first position has been completed and thereafter placing the actuator in a Hold state, wherein when in the Hold state, the actuator is driven to maintain the first position; and
   determining whether a power supply abnormality has occurred and, if so, operating the actuator in the Run state after the power supply abnormality.

18. The method of claim 17 wherein the actuator includes a bias member to bias the actuator towards a second position.

19. The method of claim 17 wherein actuator is driven by an electric motor.

20. The method of claim 17 wherein the actuator is a HVAC damper.

* * * * *

UNITED STATES PATENT AND TRADEMARK OFFICE
CERTIFICATE OF CORRECTION

| | | |
|---|---|---|
| PATENT NO. | : 7,525,266 B2 | Page 1 of 1 |
| APPLICATION NO. | : 11/275814 | |
| DATED | : April 28, 2009 | |
| INVENTOR(S) | : Mark D. Bokusky et al. | |

It is certified that error appears in the above-identified patent and that said Letters Patent is hereby corrected as shown below:

Title Page, Item (75) Inventor "Mark D. Bolusky" should read --Mark D. Bokusky--.

Signed and Sealed this

Sixteenth Day of February, 2010

David J. Kappos
*Director of the United States Patent and Trademark Office*